US012775750B2

(12) United States Patent
Jussel et al.

(10) Patent No.: US 12,775,750 B2
(45) Date of Patent: Oct. 27, 2026

(54) METHOD FOR PRODUCING A DENTAL RESTORATION

(71) Applicant: Ivoclar Vivadent AG, Schaan (LI)

(72) Inventors: Rudolf Jussel, Feldkirch (AT); Hendrik John, Buchs (CH); Christian Niedrig, Azmoos (CH)

(73) Assignee: Ivoclar Vivadent AG, Schaan (LI)

( * ) Notice: Subject to any disclaimer, the term of this patent is extended or adjusted under 35 U.S.C. 154(b) by 1209 days.

(21) Appl. No.: 17/475,395

(22) Filed: Sep. 15, 2021

(65) Prior Publication Data

US 2022/0110726 A1 Apr. 14, 2022

(30) Foreign Application Priority Data

Oct. 13, 2020 (EP) .................................... 20201553
Dec. 21, 2020 (EP) .................................... 20215936
(Continued)

(51) Int. Cl.
*G06F 30/10* (2020.01)
*A61C 9/00* (2006.01)
(Continued)

(52) U.S. Cl.
CPC .............. *G06F 30/10* (2020.01); *A61C 9/004* (2013.01); *A61C 9/0053* (2013.01);
(Continued)

(58) Field of Classification Search
CPC ..... G06F 30/10; G06F 2113/10; B33Y 50/00; B33Y 80/00; G06T 7/344; G06T 5/70; B29C 64/386; B29L 2031/7532
(Continued)

(56) References Cited

U.S. PATENT DOCUMENTS 9,662,188 B2 5/2017 Laubersheimer
11,790,529 B2 10/2023 Rohner et al.
(Continued)

FOREIGN PATENT DOCUMENTS

WO 2019/023461 A1 1/2019

OTHER PUBLICATIONS

How Dental Dentures Are Made, Dallas Prosthodontics, Aug. 10, 2020. <URL: https://web.archive.org/web/20200810013308/https://dallasprosthodontics.com/p/dentures-Dallas-TX-Dentures-How-Dental-Dentures-are-Made-p25293.asp > (Year: 2020).*
(Continued)

*Primary Examiner* — Emerson C Puente
*Assistant Examiner* — Michael Paul Mirabito
(74) *Attorney, Agent, or Firm* — Ann M. Knab; Thad McMurray

(57) ABSTRACT

The present invention relates to a method of producing a dental restoration, comprising the steps of: generating (S101) a digital tooth model having a first spatial region in which a first restoration material is disposed and a second spatial region in which a second restoration material is disposed; rendering (S102) the digital tooth model to generate an actual data set representing optical properties of the digital tooth model; determining (S103) a deviation between a target data set and the actual data set; altering (S104) at least one of the first spatial region and the second spatial region to obtain a smaller deviation between the detected target data set and the actual data set of the re-rendered digital tooth model; and producing (S105) the dental restoration based on the digital tooth model having the smaller deviation.

14 Claims, 5 Drawing Sheets

(30) Foreign Application Priority Data

Dec. 21, 2020 (EP) .................................... 20215943
Dec. 21, 2020 (EP) .................................... 20215945

(51) Int. Cl.

| | |
|---|---|
| ***A61C 13/00*** | (2006.01) |
| ***A61C 13/08*** | (2006.01) |
| ***A61C 13/09*** | (2006.01) |
| ***A61C 13/34*** | (2006.01) |
| ***A61C 19/10*** | (2006.01) |
| ***B29C 64/386*** | (2017.01) |
| ***B29L 31/00*** | (2006.01) |
| ***B33Y 50/00*** | (2015.01) |
| ***B33Y 80/00*** | (2015.01) |
| ***G06F 113/10*** | (2020.01) |
| ***G06T 3/40*** | (2024.01) |
| ***G06T 5/70*** | (2024.01) |
| ***G06T 7/00*** | (2017.01) |
| ***G06T 7/33*** | (2017.01) |
| ***G06T 15/00*** | (2011.01) |
| ***G06T 15/08*** | (2011.01) |

(52) U.S. Cl.
CPC ...... *A61C 13/0004* (2013.01); *A61C 13/0019* (2013.01); *A61C 13/082* (2013.01); *A61C 13/09* (2013.01); *A61C 13/34* (2013.01); *A61C 19/10* (2013.01); *B29C 64/386* (2017.08); *B33Y 50/00* (2014.12); *B33Y 80/00* (2014.12); *G06T 3/40* (2013.01); *G06T 5/70* (2024.01); *G06T 7/0014* (2013.01); *G06T 7/344* (2017.01); *G06T 15/00* (2013.01); *G06T 15/08* (2013.01); *B29L 2031/7532* (2013.01); *G06F 2113/10* (2020.01); *G06T 2207/10024* (2013.01); *G06T 2207/30036* (2013.01); *G06T 2210/41* (2013.01)

(58) Field of Classification Search
USPC .............................................................. 703/1
See application file for complete search history.

(56) References Cited

U.S. PATENT DOCUMENTS

| | | | | |
|---|---|---|---|---|
| 12,045,984 | B2 | 7/2024 | Jussel et al. | |
| 2014/0372085 | A1* | 12/2014 | Korten | A61C 13/0004 703/1 |
| 2018/0078577 | A1* | 3/2018 | Li | A61K 9/0053 |
| 2018/0153664 | A1* | 6/2018 | Esbech | A61C 13/082 |

OTHER PUBLICATIONS

Jawahar, Abarna et al. Applications of 3D Printing in Dentistry—A Review, 2019 (Year: 2019).*

Lin, Liwei et al. 3D Printing and Digital Processing Techniques in Dentistry: A Review of Literature, 2019 <URL: https://advanced.onlinelibrary.wiley.com/doi/epdf/10.1002/adem.201801013> (Year: 2019).*

Revilla-Leon, Marta et al. An update on applications of 3D printing technologies used for processing polymers used in implant dentistry, Jul. 2019 <URL: https://link.springer.com/article/10.1007/s10266-019-00441-7> (Year: 2019).*

* cited by examiner

METHOD FOR PRODUCING A DENTAL RESTORATION

CROSS-REFERENCE TO RELATED APPLICATIONS

This application claims priority to European Patent Application No. 20215945.5, filed on Dec. 21, 2020, European Patent Application No. EP 20201553.3, filed on Oct. 13, 2020, European Patent Application No. 20215936.4, filed on Dec. 21, 2020, and European Patent Application No. 20215943.0, filed on Dec. 21, 2020, all the disclosures of which are incorporated herein by reference in their entirety.

TECHNICAL FIELD

The present invention relates to a method for producing a dental restoration, a computer device for producing a dental restoration, and a computer program.

BACKGROUND

In analog and digital manufacturing methods of dental restorations, the selection of the restoration materials, such as their color, is made subjectively by a user with the aid of an analog shade guide. This is followed by a layer-by-layer manual restoration build-up. A restoration build-up is performed by adopting a tooth build-up from the natural model.

This can be provided in databases or libraries. Alternatively, the dental technician performs the layering manually or CAD-based on his expertise. These processes are imprecise and often do not adequately reproduce the desired natural appearance. In addition, only experienced dental technicians can achieve a natural appearance.

EP 2 486 892 B1 and corresponding U.S. Pat. No. 9,662,188B2, which US patent is hereby incorporated by reference, describe how a virtual tooth's appearance on a calibrated screen is compared with the image of the neighboring tooth by a user to gain a realistic impression. If the result is not yet satisfactory, the layer thickness or translucency can be adjusted, for example. However, inaccuracies always occur when a user visually compares the results on the screen.

SUMMARY

It is the technical object of the present invention to determine an internal structure for a dental restoration in such a way that it corresponds to a desired natural appearance.

This technical object is solved by subject-matter according to the independent claims. Technically advantageous embodiments are the subject of the dependent claims, the description, and the drawings.

According to a first aspect, the technical problem is solved by a method for producing a dental restoration, comprising the steps of generating a digital tooth model having a first spatial region in which a first restoration material is arranged and a second spatial region in which a second restoration material is arranged; rendering the digital tooth model to generate an actual data set representing the optical properties of the digital tooth model; determining a deviation between a target data set and the actual data set; altering at least one of the first spatial region and the second spatial region to obtain a smaller deviation between the detected target data set and the actual data set of the re-rendered digital tooth model; and producing the dental restoration based on the digital tooth model with the smaller deviation. The first and second spatial regions form a subvolume of the dental model. The restoration materials of the spatial regions can be kept unchanged during the method.

The method enables the internal architecture of a dental restoration to be automatically designed in such a way that an overall impression is created which fits in with the patient's overall dental appearance. In addition, subjective influences of a user on the overall optical impression of the dental restoration can be excluded and a high degree of accuracy and repeatability can be achieved in the production of the dental restoration.

In a technically advantageous embodiment of the method, the altering is performed such that the first spatial region is an outer region of the tooth model which is deformed inwardly. A second spatial region can be derived from the outer surface and deformed inward. A new bounding surface is created within the first spatial region, which has a defined distance to the outer surface. This distance can be changed selectively. This achieves the technical advantage, for example, that the method is carried out over a wide spatial range and good results are obtained.

In a further technically advantageous embodiment of the method, the altering is performed such that the second spatial region is an inner region of the tooth model which is deformed outwardly. This also achieves the technical advantage, for example, that the method is carried out in a wide spatial range and good results are obtained.

In a further technically advantageous embodiment of the method, the digital tooth model is generated with a bounding surface between the first spatial region and the second spatial region. This achieves, for example, the technical advantage that the bounding surface can be moved to alter the first and second spatial regions simultaneously.

In a further technically advantageous embodiment of the method, the bounding surface is located in a center of the digital tooth model. This achieves the technical advantage, for example, that the method quickly converges to a low deviation.

In a further technically advantageous embodiment of the method, the bounding surface runs tangentially to the tooth arc at the corresponding tooth position. This achieves the technical advantage, for example, that the method converges even faster towards a low deviation.

In a further technically advantageous embodiment of the method, the bounding surface is located on an inner side or an outer side of the digital tooth model. This provides the technical advantage, for example, that the tooth model can be altered from the inside or outside.

In a further technically advantageous embodiment of the method, a nucleation region is formed by the bounding surface, from which the first spatial region and/or the second spatial region are altered. This achieves, for example, the technical advantage of forming a subvolume from which the spatial regions can expand.

In a further technically advantageous embodiment of the method, the first spatial region and the second spatial region are arranged in layers relative to each other. This achieves, for example, the technical advantage that a natural tooth structure is imitated and a small deviation can be achieved with only a few steps.

In a further technically advantageous embodiment of the method, the first spatial region and/or second spatial region is altered until the deviation between the target and actual data set is below a predetermined value. This achieves, for example, the technical advantage that the dental restoration can be produced with a predetermined accuracy.

In a further technically advantageous embodiment of the method, the first spatial region and/or second spatial region is altered until the deviation between the target and actual data set has reached a minimum. This achieves the technical advantage, for example, that the dental restoration can be produced with an optimum match to the target data set.

In a further technically advantageous embodiment of the method, the target data set is obtained based on a natural tooth. This achieves, for example, the technical advantage that the dental restoration can be adapted to a natural tooth.

In a further technically advantageous embodiment of the method, the target data set reproduces the optical properties and/or the geometry of the natural tooth. This achieves the technical advantage, for example, of further improving the fidelity of the dental restoration.

According to a second aspect, the technical problem is solved by a computer device for producing a dental restoration, comprising a producing device suitable for carrying out the method according to the first aspect. Thereby, the same technical advantages are achieved as by the method according to the first aspect. The computer device may include a computing unit with at least one algorithm that is configured to perform the method herein.

According to a third aspect, the technical object is solved by a computer program comprising instructions that cause the computer device according to the second aspect to perform the method steps according to the first aspect. Thereby, the same technical advantages are achieved as by the method according to the first aspect. The computer program product may include program code which is stored on a non-transitory machine-readable medium, the machine-readable medium including computer instructions executable by a processor, which computer instructions cause the processor to perform the method herein.

BRIEF DESCRIPTION OF THE DRAWINGS

Examples of embodiments of the invention are shown in the drawings and are described in more detail below.

DETAILED DESCRIPTION

Figure 1:
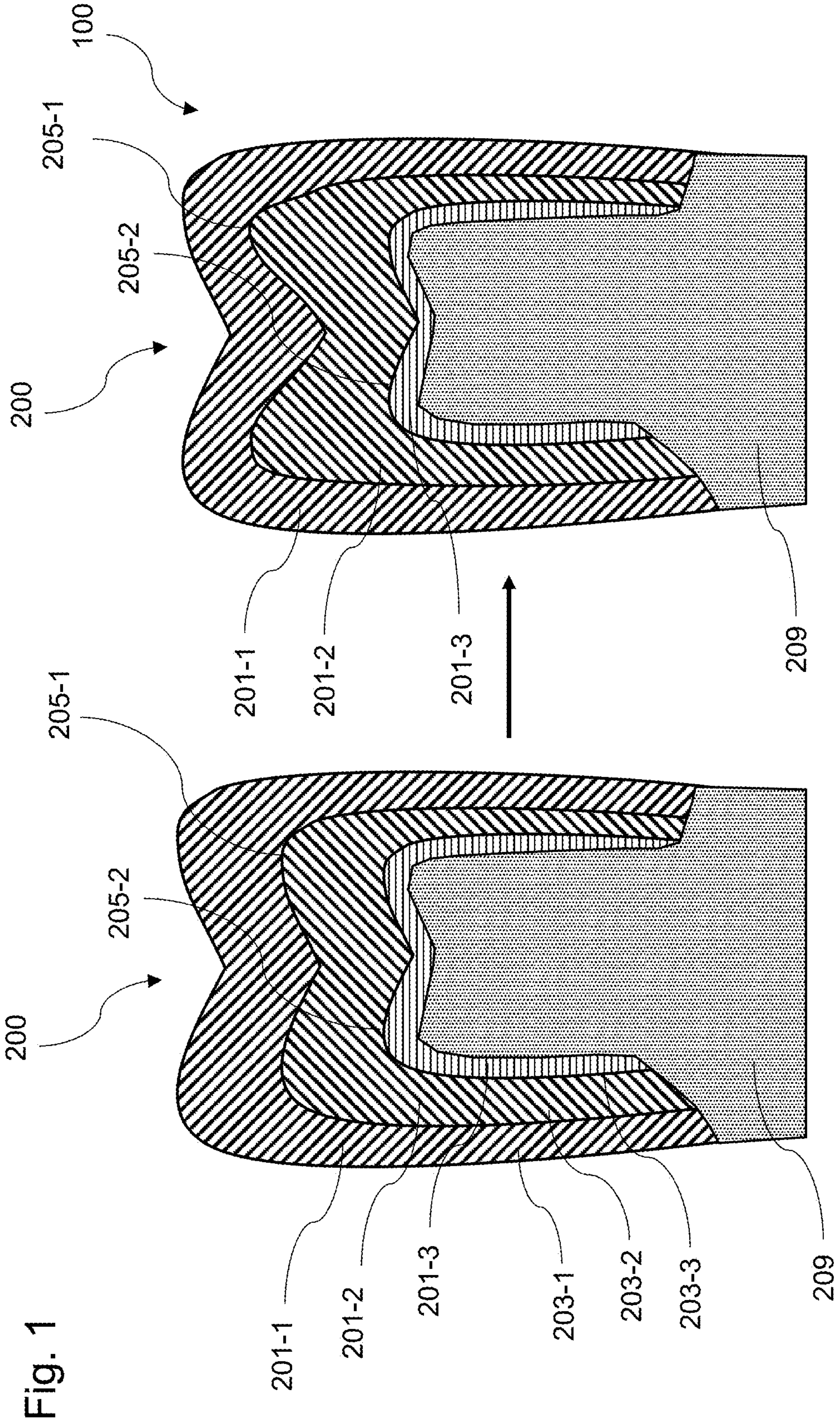
FIG. 1 a schematic representation of a digital tooth model.

FIG. 1 shows a schematic representation of a digital tooth model 200 which is placed on a residual tooth 209. The digital tooth model 200 determines the outer shape and the inner spatial structure of the subsequent dental restoration 100. The outer shape can be generated in a CAD program for this purpose. The outer shape is determined by modeling the dental restoration 100 in the CAD program.

The inner spatial structure of the dental model 200 can be calculated or taken from databases, for example derived from the structure of a natural tooth or calculated from the outer shape of the dental restoration 100 or a natural tooth. Given a predetermined external shape of the dental restoration 100, an internal layered structure can thus be determined by the dental model 200 and each individual layer 203-1, 203-2, and 203-3 can be assigned its own restoration material 201-1, 201-2, and 201-3 with predetermined optical material parameters. Between the restoration materials 201-1, 201-2, and 201-3 are the bounding surfaces 205-1 and 205-2. The different restoration materials 201-1, . . . , 201-3 in the spatial regions 203-1, . . . , 203-3 are separated from each other by the bounding surfaces 205-1 and 205-2.

For example, the dental model 200 reproduces a dental restoration 100 that is constructed in layers using three different restoration materials 201-1, 201-2 and 201-3. In an outer layer 203-1, the restoration material 201-1 is used, in a middle layer 203-2, the restoration material 201-2 is used, and in an inner layer 203-3, the restoration material 201-3 is used. The optical and physical properties of the respective assigned restoration materials 201-1, . . . , 201-3 are known, such as color values, scattering values, reflectance values, transmittance values, and/or absorption values.

If the outer shape and inner structure of the tooth model 200 with the different restoration materials 201-1, . . . , 201-3 are known, the subsequent appearance of the dental restoration 100 can be calculated from this. By means of a rendering (light simulation method) using ray tracing, the color and translucency of the dental restoration 100 are calculated based on the created tooth model 200. In this way, the subsequent appearance and optical impression of the biomimetic dental restoration, such as a crown, partial crown, inlay, onlay or veneer, can be precisely calculated from the tooth model 200.

The rendering is performed by means of a physically correct simulation of the interaction of light with the restoration materials 201-1, . . . , 201-3 used. The known optical parameters of the individual restoration materials 201-1, . . . , 201-3 are used to generate a computer-aided view of the dental restoration 100.

For this purpose, existing natural tooth material can also be considered, such as a residual tooth 209 on which the dental restoration 100 is to be placed. During rendering, the optical impression of the subsequent dental restoration 100 is therefore calculated for the specified inner structure and the selected restoration materials 201-1, . . . , 201-3. For the rendering, a computer-aided calculation of reflection, transmission and absorption values in the visible range at at least three wavelengths can be performed.

A target data set is first determined for the producing method of the dental restoration 100. The target data set can be obtained by optically capturing and evaluating an adjacent tooth. For this purpose, an electronic camera or a 3D scanner can be used to determine the color values, reflection, transmission and/or absorption values and the spatial shape or an image of the natural tooth. In addition, a color measurement or translucency measurement can also be performed with a translucency scheme based on the eight natural color spaces. Based on these data, the dental restoration 100 is planned with as identical properties as possible.

For this purpose, an initial tooth model 200 is created for the dental restoration 100, which is used to define the outer shape and the inner spatial regions 203-1, . . . , 203-3 of the tooth model 200 with the assigned restoration materials 201-1, 201-2 and 201-3. Based on this initial tooth model 200, the optical appearance of the dental restoration 100 is rendered to create an actual data set that reflects the optical properties.

Ideally, the rendering of the dental restoration 100 is performed from the same viewing angle or perspective from which the target data set was obtained based on the natural tooth.

Rendering can also be performed from different viewing angles to improve the results. Rendering can be performed for any viewing angle and any selectable environmental situations, such as a predetermined lighting situation, considering adjacent teeth, a position of the dental restoration 100 in the oral cavity, or a shape and optical properties of the tooth remnant to be prepared. Other influencing conditions can also be considered during rendering, such as known optical data of a cement, composite and/or adhesive layer.

Subsequently, a comparison (map matching) of the rendered actual image according to the actual data set with the acquired target image according to the target data set is performed and a deviation is determined, for example a mean deviation or minimum or maximum values. The deviation is a numerical value that quantifies the difference between the actual data set and the target data set.

To further adapt the subsequent appearance of the dental restoration 100, the spatial regions 203-1, . . . , 203-3 of the tooth model 200 can be altered. Both the boundary surfaces 205-1 and 205-2 and the subvolumes of the individual spatial areas 203-1, . . . , 203-3 can be altered. In the case of large deviations, not only the spatial areas 203-1, . . . , 203-3 but additionally also the restoration material 201-1, . . . , 201-3 used can be adjusted. By adjusting the spatial areas 203-1, . . . , 203-3, for example, the topography of the bounding surface 205-1 between incisal and dentin can be altered while maintaining the outer shape of the tooth model 200.

The altered tooth model 200 is then rendered again and a new comparison is made between the rendered actual data set and the recorded target data set to determine a new deviation. The steps of altering the tooth model and determining a deviation are then repeated until the deviation is below a specified value.

This results in an iterative adaptation of the dental model 200 by adapting the spatial regions 203-1, . . . , 203-3. The adaptation of the internal architecture of the tooth model 200 is performed to optimize the overall optical appearance of the dental restoration 100.

Figure 2:
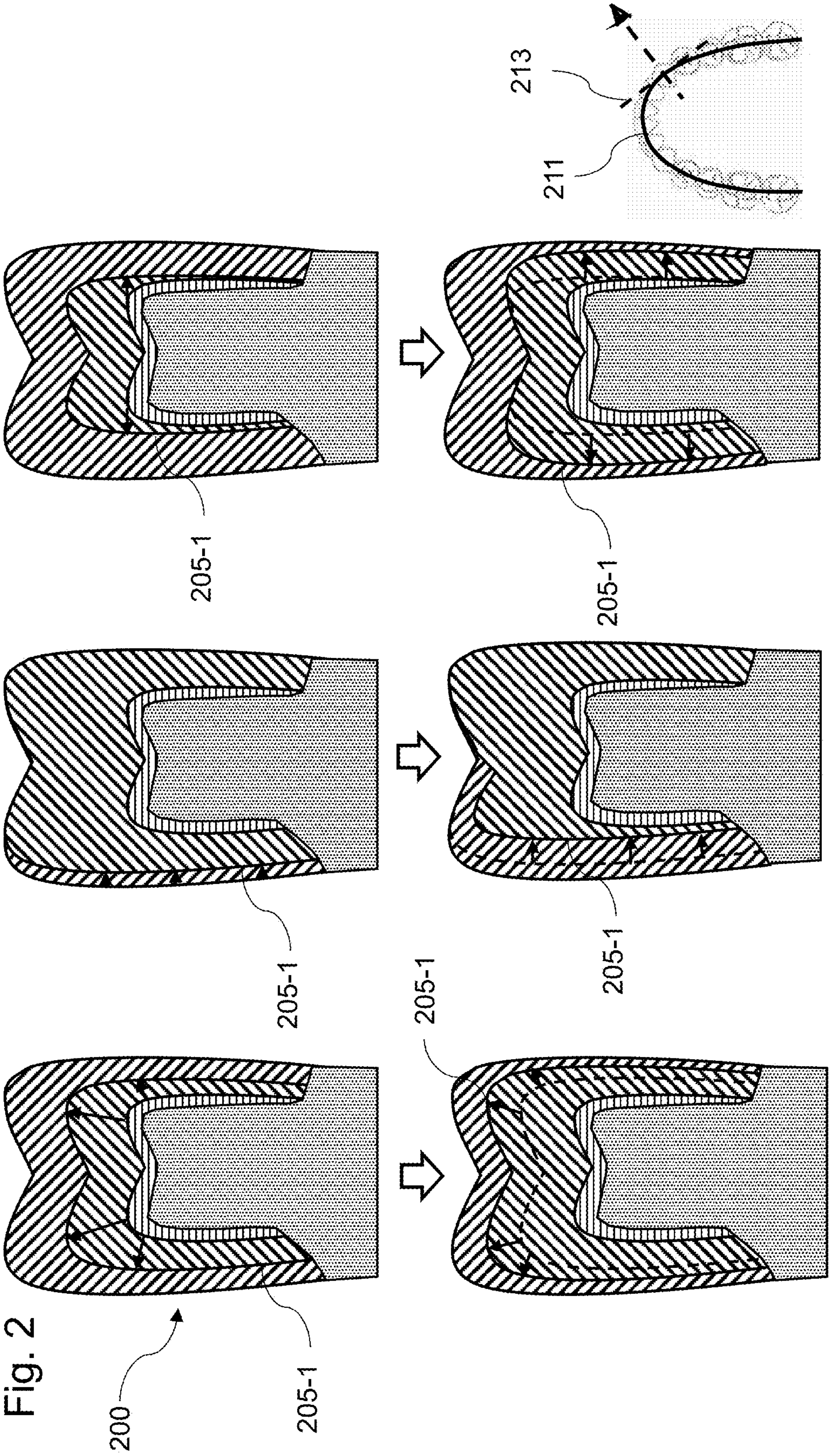
FIG. 2 an altering of the spatial areas of a tooth model.

FIG. 2 shows changing the spatial regions of the tooth model 200 as part of the producing method.

In an initially homogeneous volume of the tooth model 200, nucleation surfaces are defined for the formation of additional inner layers. The nucleation surfaces can be located at any position within the volume of the tooth model 200, for example at a bounding surface to the tooth substrate (preparation), at a labial surface of the dental restoration, in a center plane 213 tangential to the dental arch 211 or a rotationally symmetrical envelope of the vertical center axis of the tooth model 200.

The starting point is a homogeneous distribution of the restoration material, such as an artificial dentin material, in the spatial region of the entire dental restoration 100. Starting from a labial surface (incisal) of the first spatial region, a second spatial region is formed, which is deformed into the interior of the dental restoration 100 and later forms the incisal layer. This second spatial region is associated with a restoration material having different optical and physical properties. The second spatial region has bounding surface 205-1 with the first spatial region.

The nucleation layer may also originate from a surface of the tooth model 100 to grow a new layer of dentin material in a homogeneous area of enamel material. The nucleation layer can also be spatially located on a mid-plane 213 in the tooth model 200, for example tangential to the dental arch 211 at the corresponding tooth position.

A tooth model 200 with a predefined outer shape and inner architecture consisting of several layers can also be predefined. In this case, the bounding surfaces 205 of the layers can be iteratively deformed in three dimensions to specifically approximate the overall optical appearance to the optical target state.

Starting from a newly created bounding surface 205, further additional layers can be added using the same procedure. The deformation of the respective bounding surfaces 205 is carried out by an iterative comparison of the target data set and the actual data set until a predefined limit value is reached.

Figure 3:
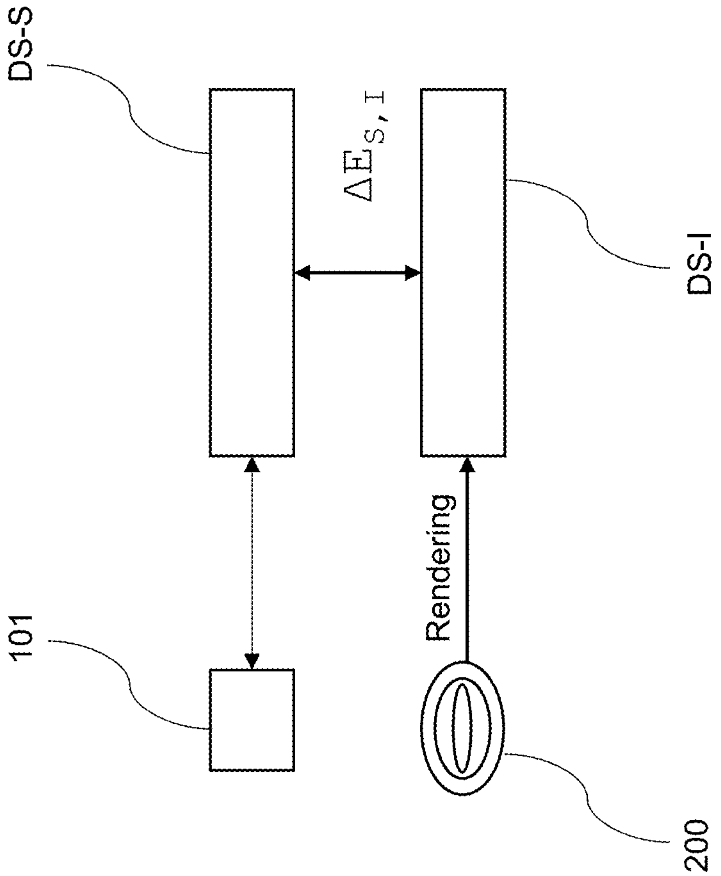
FIG. 3 an illustration of a comparison between a target data set and an actual data set.

FIG. 3 shows a schematic representation of a deviation $\Delta E_{S,I}$ between the target data set DS-S and the actual data set DS-I. The target data set DS-S is obtained, for example, by an electronic camera 101.

The digitally generated dental model 200 includes data about the spatial geometry of the dental restoration 100 and the associated restoration materials 201-1, . . . , 201-3 from which the dental restoration 100 is to be made and the spatial regions 203-1, 203-2 and 203-3 in which the restoration materials 201-1, . . . , 201-3 are arranged. The optical and physical properties of the restoration materials 201-1, . . . , 201-3 required for rendering are known in the rendering software. These can be taken from a parameter table, which is constantly supplemented with new materials.

The actual data set DS-I is obtained by rendering the digital tooth model 200 with a selected material combination. Rendering considers the spatial geometry of the dental restoration 100 and the optical and physical properties of the various restoration materials 201-1, . . . , 201-3 that occur. An adhesive material and a die can also be considered.

The propagation of light in the tooth model 200 can be described by Maxwell's equations. For example, the rendering uses the Radiative Transport Equation (RTE), in which a propagation medium is described by the absorption coefficient, the scattering coefficient, the refractive index and the scattering phase function.

The digital tooth model 200 includes the data on the spatial geometry of the dental restoration 100 and the internal architecture, as well as the absorption coefficient, the scattering coefficient, the refractive index, and the scattering phase function for the respective restoration materials 201-1, . . . , 201-3. The scattering phase function, when rendered based on the tooth model 200 with the aforementioned parameters, can be numerically solved to any desired accuracy in a Monte Carlo simulation in which a plurality of photons propagates through the tooth model 200 along random paths.

From this, an actual data set DS-I for the appearance of the dental restoration 100 can be calculated by rendering, which considers the materials used, the external shape and the internal architecture of the tooth model 200. This calculated actual data set DS-I can then be compared to the target data set DS-S, which has been obtained based on an adjacent tooth. To simplify the comparison, this can be performed in a two-dimensional derivation (two-dimensional image). In general, however, three-dimensional methods can also be used. A numerical value is calculated as a measure of the deviation $\Delta E_{S,I}$ between the actual data set DS-I and the target data set DS-S.

Figure 4:
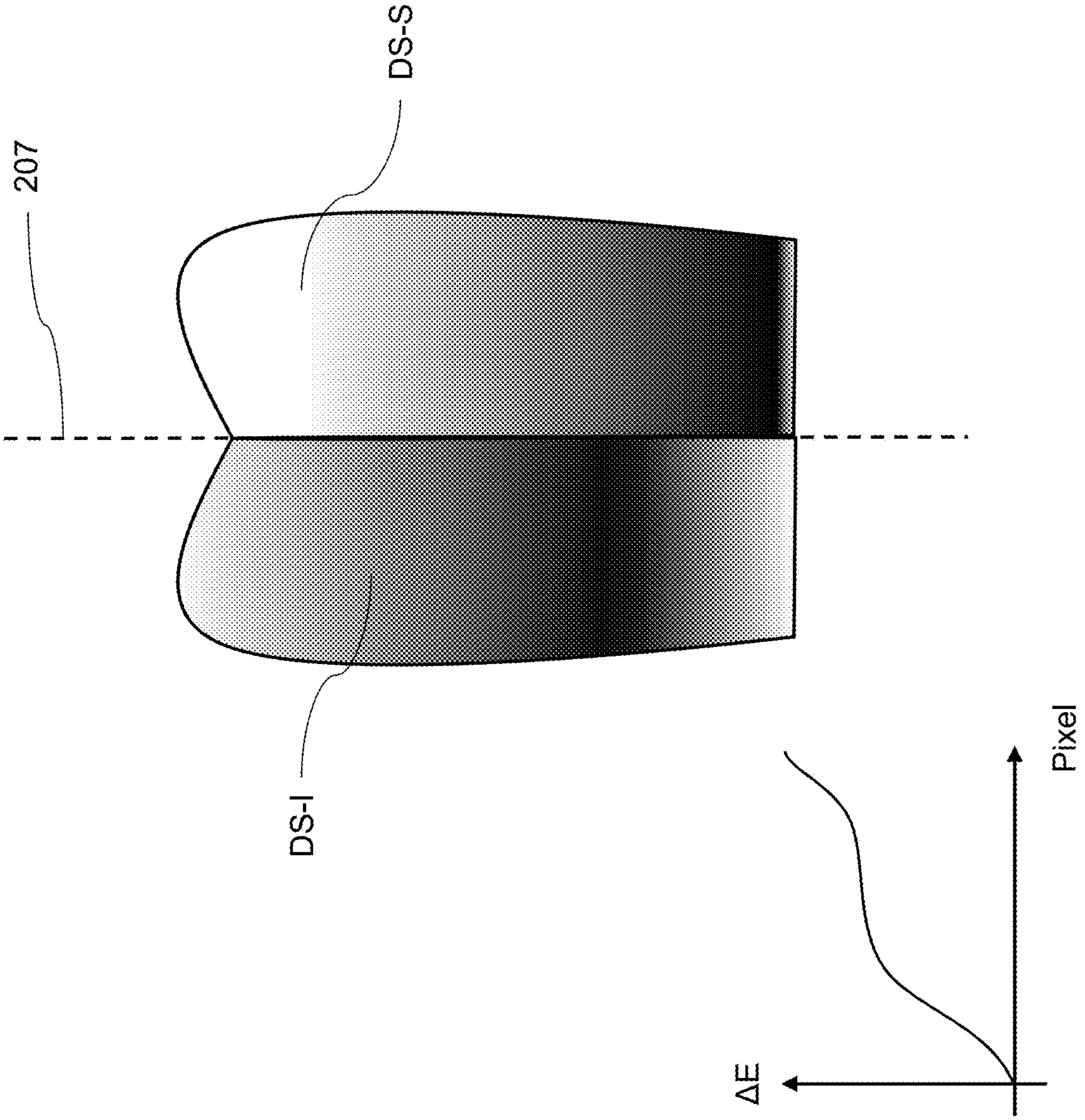
FIG. 4 a schematic representation for calculating a deviation between a target data set and an actual data set.

FIG. 4 shows a schematic representation for calculating a deviation $\Delta E_{S,I}$ between the target data set DS-S and an actual data set DS-I. For example, the data set DS-S comprises a representation of the tooth in a given perspective. In contrast, the data set DS-I, which has been rendered from the tooth model 200, comprises a representation of the tooth model 200 in the same perspective. The two images from the target data set DS-S and the actual data set DS-I are scaled to the same size and placed next to each other.

The Euclidean deviation $\Delta E_{S,I}$ between the target data set DS-S and the actual data set DS-I can be calculated by summing up the differences in the color values of the pixels along the comparison lines 207, for example in the L*a*b* color space. These comparison lines 207 can be moved arbitrarily, for example by moving the halves of the teeth together. In general, however, the comparison line 207 may have a different shape. The comparison can be made at pixel level as the smallest resolution.

$$\Delta E_{S,I} = \sqrt{(L_S^* - L_I^*)^2 + (a_S^* - a_I^*)^2 + (b_S^* - b_I^*)^2}$$

The greater the difference in the color gradient along the comparison line 207, the greater the numerical deviation $\Delta E_{S,I}$. If there is a perfect color match between the target data set DS-S and the actual data set DS-I, the deviation $\Delta E_{S,I}$ is zero. In general, however, other methods can be used to calculate the deviation $\Delta E_{S,I}$, such as based on spectral information.

Figure 5:
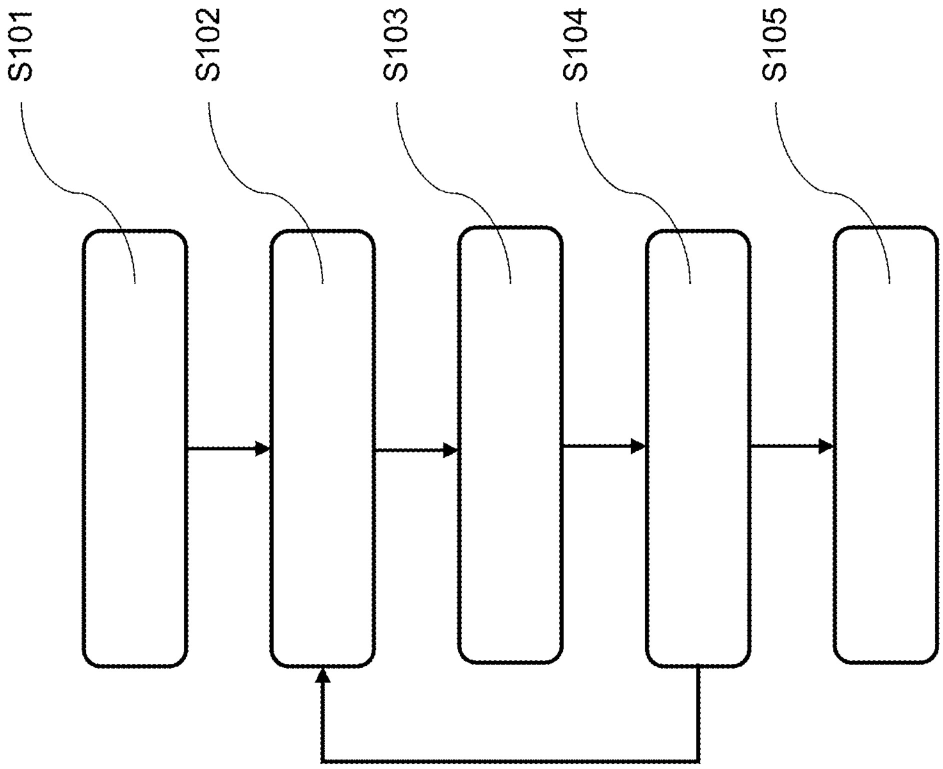
FIG. 5 a block diagram of a method for producing a dental restoration.

FIG. 5 shows a block diagram of a method for producing the dental restoration 100. First, in step S101, the digital tooth model 200 is generated with the first spatial region 203-1 in which a first restoration material 201-1 is arranged and the second spatial region 203-2 in which a second restoration material 201-2 is arranged. This tooth model 200 serves as the starting point for the method. In step S102, the initial digital tooth model 200 is rendered to generate the actual data set DS-I that represents the optical properties of the digital tooth model 200. The calculation and simulation of the tooth model 200 is performed based on physical-optical material-specific characteristics using a physically correct simulation tool. In step S103, the deviation between the target data set DS-S and the actual data set DS-I is determined.

In step S104, the first spatial region 203-1 and/or the second spatial region 203-2 are altered to obtain a smaller deviation $\Delta E_{S,I}$ between the acquired target data set DS-S and the actual data set DS-I of the re-rendered digital tooth model 200. For this purpose, the step S103 of rendering the dental model 200 with the deformed regions 203 and the step S104 of calculating a deviation between the target data set DS-S and the actual data set DS-I are performed again. For example, if a predetermined limit value for the deviation is not exceeded, the internal shaping of the tooth model 200 with the restoration materials 201-1, . . . , 201-3 is frozen.

In step S105, the dental restoration 100 is then produced based on the determined digital tooth model 200 with the smaller deviation. The dental restoration 100 can be produced by a 3D printing method or another suitable method based on the dental model 200 with the calculated spatial regions and the respective restoration materials 201-1, . . . , 201-3.

In this case, a computer device may be used to perform the calculation steps and subsequently produce the dental restoration 100 using the production device. For this purpose, the computer device executes a computer program comprising instructions that cause the computer device to perform the required method steps. The computer device includes a processor and a digital memory that stores the data sets and a computer program that executes the procedural steps and suitably controls a production device. The producing device is, for example, a 3D printer that prints the dental restoration 100 with the various restoration materials. However, in general, other producing devices can be used that can produce the dental restoration with the different restoration materials.

After insertion of the dental restoration 100 created in this way, the optical appearance of the biomimetic denture is optimally approximated to the desired natural appearance.

The method is an iterative, closed digital method in which a modeling and simulation of the dental restoration 100 approximates as closely as possible the natural appearance in the patient's mouth. Because the physical and optical parameters of known restoration materials 201-1, . . . , 201-3 are simulated in the spatial areas 203-1, 2032-and 203-3, a computer-aided lifelike appearance of the dental restoration 100 can be obtained.

The producing method can achieve an optimum design of the inner multilayer structure of the tooth model 200 and at the same time ensure optimum esthetics of the subsequent dental restoration 100. For this purpose, it is possible to find an optimum thickness and spatial position of the individual spatial areas 203-1, . . . , 203-3. The restoration materials 201-1, . . . , 201-3 for creating the multilayer dental restoration 100 for producing the dental restoration 100 and their arrangement are known.

The method is thus an iterative method in which an optimized internal architecture of a dental restoration 100 is automatically generated. This can be achieved independently of an initial structural specification for the tooth model 200. The match between the actual data set and the target data set (best match) ensures a repeatable optimal result with the available restoration materials 201-1, . . . , 201-3 and optimal esthetics of the dental restoration 100. Subjective influences of the user on the overall optical impression can be excluded here. Objective accuracy and repeatability of the procedure exclude errors due to a spatial design of a user.

All features explained and shown in connection with individual embodiments of the invention may be provided in different combinations in the subject-matter of the invention to simultaneously realize their beneficial effects.

All method steps can be implemented by devices which are suitable for executing the respective method step. All functions that are executed by the actual features can be a method step of a method.

In some embodiments, the innovations may be implemented in diverse general-purpose or special-purpose computing systems. For example, the computing environment can be any of a variety of computing devices (e.g., desktop computer, laptop computer, server computer, tablet computer, gaming system, mobile device, programmable automation controller, etc.) that can be incorporated into a computing system comprising one or more computing devices.

In some embodiments, the computing environment includes one or more processing units and memory. The processing unit(s) execute computer-executable instructions. A processing unit can be a central processing unit (CPU), a processor in an application-specific integrated circuit (ASIC), or any other type of processor. In a multi-processing system, multiple processing units execute computer-executable instructions to increase processing power. A tangible memory may be volatile memory (e.g., registers, cache, RAM), non-volatile memory (e.g., ROM, EEPROM, flash memory, etc.), or some combination of the two, accessible by the processing unit(s). The memory stores software implementing one or more innovations described herein, in the form of computer-executable instructions suitable for execution by the processing unit(s).

A computing system may have additional features. For example, in some embodiments, the computing environment includes storage, one or more input devices, one or more output devices, and one or more communication connections. An interconnection mechanism such as a bus, controller, or network, interconnects the components of the computing environment. Typically, operating system software provides an operating environment for other software executing in the computing environment, and coordinates activities of the components of the computing environment.

The tangible storage may be removable or non-removable, and includes magnetic or optical media such as magnetic disks, magnetic tapes or cassettes, CD-ROMs, DVDs, or any other medium that can be used to store information in a non-transitory way and can be accessed within the computing environment. The storage stores instructions for the software implementing one or more innovations described herein.

Where used herein, the term "non-transitory" is a limitation on the computer-readable storage medium itself—that is, it is tangible and not a signal—as opposed to a limitation on the persistence of data storage. A non-transitory computer-readable storage medium does not necessarily store information permanently. Random access memory (which may be volatile, non-volatile, dynamic, static, etc.), read-only memory, flash memory, memory caches, or any other tangible, computer-readable storage medium, whether synchronous or asynchronous, embodies it.

The input device(s) may be, for example: a touch input device, such as a keyboard, mouse, pen, or trackball; a voice input device; a scanning device; any of various sensors; another device that provides input to the computing environment; or combinations thereof. The output device may be a display, printer, speaker, CD-writer, or another device that provides output from the computing environment.

The scope of protection of the present invention is given by the claims and is not limited by the features explained in the description or shown in the figures.

REFERENCE LIST

100 dental restoration
101 electronic camera
200 tooth model
201 restoration material
203 spatial area/shift
205 bounding surface
207 comparison line
209 tooth stump
211 dental arch
213 middle level
DS-I actual dataset
DS-S target data set

The invention claimed is:

1. A method of producing a dental restoration (100), comprising the steps:

acquiring a target data set (DS-S) representing optical properties of a natural tooth by capturing, with an electronic camera (101) or a 3D scanner, color, reflection, transmission, and/or absorption values of the natural tooth;

generating (S101) a digital dental model (200), the digital dental model (200) having a first spatial region (203-1) in which a first restoration material (201-1) is arranged and a second spatial region (203-2) in which a second restoration material (201-2) is arranged, wherein the first spatial region (203-1) and the second spatial region (203-2) are separated by a bounding surface (205-1);

rendering (S102) of the digital dental model (200) to generate an actual data set (DS-I) representing the optical properties and physical properties comprising an absorption coefficient, a scattering coefficient and a refractive index of the digital dental model (200), wherein the optical and physical properties of the first restoration material (201-1) and the second restoration material (201-2) are taken from a parameter table, which is constantly supplemented with new materials;

determining (S103) a deviation ($\Delta E_{S, I}$) between a target data set (DS-S) and the actual data set (DS-I) by calculating a distance between the target data set (DS-S) and the actual data set (DS-I) in the L*a*b* color space by summing up the differences in color values of pixels along comparison lines (207);

altering (S104) the first spatial region (203-1) and/or second spatial region (203-2) by deforming the bounding surface (205-1) to obtain a smaller deviation (AEs, 1) between the target data set (DS-S) and the actual data set (DS-I) of a re-rendered digital dental model (200) wherein the altering is performed such that the first spatial region is an outer region of the digital dental model (200) which is deformed inwardly and the second spatial region (203-2) is an inner region of the digital dental model (200) which is deformed outwardly;

producing (S105) the dental restoration (100) based on the digital dental model (200) with the smaller deviation wherein the production process involves additive manufacturing techniques to fabricate the dental restoration (100) by depositing the first restoration material (201-1) and the second restoration material (201-2) in layers corresponding directly to the first spatial region (203-1) and the second spatial region (203-2) of the digital dental model (200) having the smaller deviation, such that the spatial geometry of the deposited layers in the fabricated dental restoration (100) reflects the deformed positions of the first spatial region (203-1) and the second spatial region (203-2) determined in the altering step (S104).

2. The method according to claim 1, wherein a bounding surface is located in a center of the digital dental model (200).

3. The method according to claim 2, wherein the bounding surface (205) is tangential to the dental arch (211) at a corresponding tooth position.

4. The method according to claim 1, wherein the first spatial region (203-1) and the second spatial region (203-2) are arranged in layers relative to each other.

5. The method according to claim 1, wherein the first spatial region (203-1) and/or second spatial region (203-2) is altered until the deviation is below a predetermined value.

6. The method according to claim 1, wherein the first spatial region (203-1) and/or second spatial region (203-2) is altered until the deviation has reached a minimum value.

7. The method according to claim 1, wherein the target data set (DS-S) is obtained based on a natural tooth.

8. The method according to claim 7, wherein the target data set (DS-S) represents the optical properties and/or the geometry of the natural tooth.

9. A computer apparatus for producing a dental restoration (100), comprising a production apparatus adapted to perform the method of claim 1.

10. A computer apparatus for producing a dental restoration (100), comprising a production apparatus and a computer processor with at least one algorithm that is configured to perform the method of claim 1.

11. A computer program product comprising program code which is stored on a non-transitory machine-readable medium, the machine-readable medium comprising computer instructions executable by a processor, which computer instructions cause the processor to perform the method according to claim 1.

12. The method according to claim 1, wherein the rendering step (S102) uses a physically correct light simulation that models propagation of light through the digital dental model (200) by solving the Radiative Transport Equation using a Monte Carlo simulation in which a plurality of photons propagate through the digital dental model (200) along random paths to generate the actual data set (DS-I).

13. The method according to claim 1, wherein the steps of rendering (S102), determining (S103), and altering (S104) are repeated in a closed-loop iterative sequence, wherein after each altering step the digital dental model (200) is re-rendered using the Monte Carlo simulation to generate an updated actual data set (DS-I), a new deviation (AEs,1) is calculated, and the iterative sequence continues until the deviation (AEs,1) reaches a predetermined value or a minimum value.

14. The method according to claim 1, wherein known optical parameters of the first restoration material (201-1) and the second restoration material (201-2) are used to generate a computer-aided view of the dental restoration (100).

* * * * *